United States Patent [19]
Breitweiser, Jr. et al.

[11] Patent Number: 5,408,914
[45] Date of Patent: Apr. 25, 1995

[54] MUSICAL INSTRUMENT TRAINING SYSTEM HAVING DISPLAYS TO IDENTIFY FINGERING, PLAYING AND INSTRUCTIONAL INFORMATION

[75] Inventors: Frederick W. Breitweiser, Jr., East Rutherford; Paul F. Weeks, Jr., Bloomfield, both of N.J.

[73] Assignee: Brietweiser Music Technology Inc., Clifton, N.J.

[21] Appl. No.: 988,816

[22] Filed: Dec. 10, 1992

[51] Int. Cl.$^6$ ............................................. G10G 1/02
[52] U.S. Cl. ............................... 84/477 R; 84/464 A; 84/455
[58] Field of Search ...................... 84/454, 455, 470 R, 84/477 R, 485, 723, 464 R, 464 A

[56] References Cited

U.S. PATENT DOCUMENTS

| | | | |
|---|---|---|---|
| 3,881,390 | 5/1975 | Gullickson | 84/478 |
| 3,978,757 | 9/1976 | Johnson et al. | 84/485 R |
| 4,196,652 | 4/1980 | Raskin | 84/458 |
| 4,286,495 | 9/1981 | Roof | 84/485 R |
| 4,318,327 | 3/1982 | Toups | 84/477 R |
| 4,327,623 | 5/1982 | Mochida et al. | 84/454 |
| 4,331,060 | 5/1982 | Allen | 84/454 |
| 4,378,720 | 4/1983 | Nakada et al. | 84/1.03 |
| 4,791,848 | 12/1988 | Blum, Jr. | 84/453 |
| 4,895,060 | 1/1990 | Matsumoto | 84/616 |
| 4,915,005 | 4/1990 | Shaffer et al. | 84/314 R |
| 5,040,447 | 8/1991 | Murata et al. | 84/612 |
| 5,214,231 | 5/1993 | Ernst et al. | 84/652 |
| 5,266,735 | 11/1993 | Shaffer et al. | 84/609 |
| 5,270,475 | 12/1993 | Weiss et al. | 84/603 |

*Primary Examiner*—William M. Shoop, Jr.
*Assistant Examiner*—Jeffrey W. Donels
*Attorney, Agent, or Firm*—Jeremiah G. Murray

[57] ABSTRACT

A musical instrument training system for a stringed musical instrument having a body, a fingerboard, a plurality of strings, and an electric pickup. A fingering display (left hand) and a playing display (right hand) are mounted on the fingerboard. A control circuit, mounted on the body, receives input signals from one channel of a stereo for controlling the fingering and playing displays. The fingering and playing displays comprise an array of LEDs and LCDs that indicate the strings to finger, the fingers to use, the strings to play and the direction of play. A freeze control permits the user to "freeze" a section of the input signals in a buffer for repetitive practice. A tuning circuit permits the user to compare the tone of a string with a stored tone via a tuning display to help tune the instrument.

38 Claims, 5 Drawing Sheets

MUSICAL INSTRUMENT TRAINING SYSTEM HAVING DISPLAYS TO IDENTIFY FINGERING, PLAYING AND INSTRUCTIONAL INFORMATION

BACKGROUND OF THE INVENTION

1. Field of the Invention

This invention relates to musical instrument training systems. More specifically, the invention relates to systems for facilitating instruction of musicians in playing a stringed musical instrument such as a guitar and in learning related styles, techniques and theory.

2. Description of the Prior Art

In the past, it has been the general practice to employ a variety of automated training aids designed to help students of stringed musical instruments learn particular execution skills such as fingering, strumming, plucking, etc. For example, visual training aids that diagrammatically show a guitar student particular fingering patterns and the corresponding musical staff diagrams have been available for a number of years. Special visual/audio training systems have also been used in the past. These systems permit a student to see a display of fingering diagrams and, simultaneously, to hear related prerecorded instructions, notes or cords.

U.S. Pat. No. 4,286,495, granted Sep. 1, 1981 to Roof, discloses a prior art visual guitar training device. The Roof guitar has a first array of lights embedded in its fingerboard and a second array of lights mounted near the sounding hole. Each of the fingerboard lights is located near different finger positions. When energized, the fingerboard lights act as visual fingering indicators by displaying predetermined left-hand fingering patterns directly on the fingerboard. The lights in the second array indicate the proper strings to be strummed, plucked, picked or otherwise played with the right hand. A manual chord-select switch that is also mounted on the Roof guitar permits the student musician to select predetermined musical chords from a limited set of chords. The manual switches are used to control the light arrays so that visual fingering patterns and right-hand instructions of the selected chord are indicated by the lights. Although this and similar systems have served the purpose they have not proved entirely satisfactory primarily because the information provided to the student is only visual and the number of different fingering patterns is limited to a small number of switch positions.

U.S. Pat. No. 4,915,005, granted Apr. 10, 1990 to Shaffer et al., is another visual guitar training device. The Shaffer et al. patent discloses a fingering display that also includes an array of lights embedded in a guitar fingerboard. A number of electrical switches are manually operable by the musician to select a desired note. For each of the notes selected, a light display is activated that shows all of the possible fingering positions for that note. If a scale or chord is selected, then all of the fingering positions for all of the notes of the entire scale or chord are displayed. Like the Roof device, the Shaffer et al. training device provides only visual information to the user. Although the amount of information available in this device is greater than what is available in the Roof device, the amount of information is still quite limited.

U.S. Pat. No. 4,791,848, granted Dec. 20, 1988 to Blum, Jr., shows a prior art visual/audio guitar training system. This system is made up of an electric guitar and a number of electronic components. The guitar includes a fingerboard having an array of lights imbedded therein. The lights are electrically connected to a processing circuit contained in one of the electronic components. A two-track cassette containing audio signals on one track and light-control signals on the other track is played by another component that includes a conventional two-channel cassette player. The audio signals from the player are outputted by one channel output to a loudspeaker component to play music and/or instructions. Simultaneously, the light-control signals are transmitted via the other channel output to the processing circuit where they are processed and transmitted to the guitar fingerboard. The light-control signals selectively energize the lights to display particular fingering patterns of notes, chords, etc. corresponding to the music and/or instructions being played by the loudspeaker. Additionally, a conventional electric guitar output is transmitted from the guitar pickup to the loudspeaker so that the musical results of the student's playing may also be heard. In this system, the student can hear audio information while viewing corresponding visual fingering information and listening to the guitar output.

From these prior art examples, it can be seen that there has been a long recognized need for improved stringed-instrument training systems. Ideally, such systems would be capable of providing the student musician with instructional information that is both visual and audio and corresponds to a wide variety of musical styles and techniques that are presented via musical notes, scales, chords, melodies, compositions, etc.; would have the capability of providing the musician with extensive visual left-hand and right-hand information in substantially a single viewing area; would be compatible with conventional electronic musical storage and playback devices; would permit the student to easily select small musical segments from larger pieces for concentrated training; would be simple in construction and would be dependable in operation. The present invention fulfills this need.

SUMMARY OF THE INVENTION

The general purpose of this invention is to provide a musical instrument training system that can provide visual and audio information such that most musicians ranging from a beginning student to an accomplished artist would find it beneficial to use.

Broadly, the present invention is directed to a musical instrument training system comprising a musical instrument having a plurality of strings, a fingerboard and a body. A fingering display and a playing display are mounted on the fingerboard. A control circuit, mounted on the body, receives input signals and controls the fingering and playing displays in response to the input signals.

More specifically, the invention is directed to a musical instrument training system for a stringed musical instrument having a body, a fingerboard, a plurality of strings, and an electric pickup. A fingering display (left hand) and a playing display (right hand) are mounted on the fingerboard. A control circuit, mounted on the body, receives input signals from one channel of a stereo for controlling the fingering and playing displays. The fingering and playing displays comprise an array of LEDs and LCDs that indicate the strings to finger, the fingers to use, the strings to play and the direction of play. A freeze control permits the user to "freeze" a segment of the input signals in a buffer for repetitive practice.

According to another aspect of the invention, a musical instrument tuning system comprises a musical instrument having a plurality of strings, a fingerboard, a body, and an electric pickup. A microprocessor is mounted on the body. A tuning display is mounted on the instrument for indicating whether a selected one of the strings is in tune. A manually operable string-select control is connected to the microprocessor for selecting one of the strings to tune. A multi-frequency generator connected to the microprocessor generates an output frequency related to the selected one of the strings. A frequency comparator is connected to the multi-frequency generator and the electric pickup for comparing the output frequency with the natural frequency of the selected one of the strings and for controlling the tuning display.

It is, therefore, an object of the present invention to provide a musical instrument training system that is capable of providing visual and audio training information on a wide variety of techniques and styles for both the beginner and the experienced musician alike.

The exact nature of this invention as well as other objects and advantages thereof will be readily apparent from consideration of the following specification relating to the annexed drawing.

DETAILED DESCRIPTION OF THE PREFERRED EMBODIMENT

Figure 1:
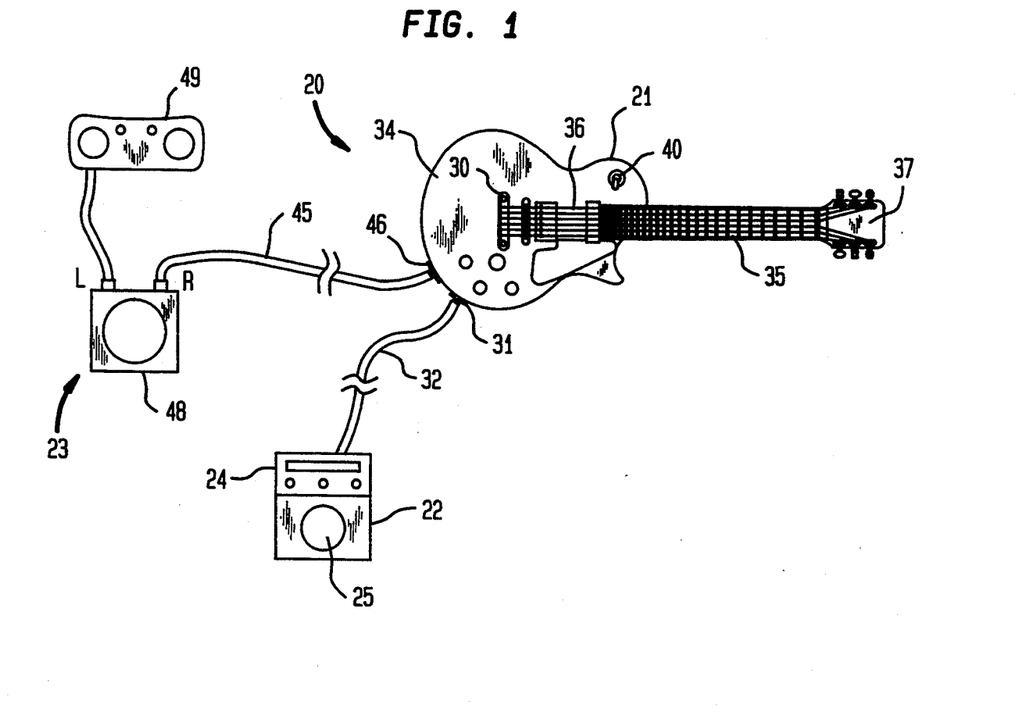
FIG. 1 is a simplified pictorial view illustrating an exemplary configuration that shows the major components of a preferred embodiment of the present invention.
Figure 2:
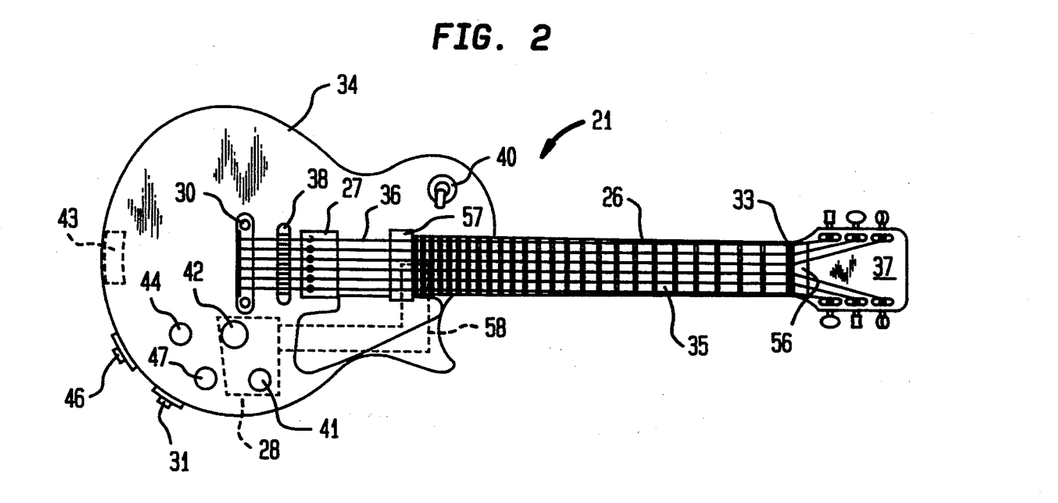
FIG. 2 is a plan view of the instructional electric guitar shown in FIG. 1 which is made in accordance with the present invention.

Referring now to the drawings, there is shown in FIGS. 1 and 2 a musical training system 20 comprising an electric guitar 21, an electric guitar sound system 22 and a stereo player system 23. Guitar sound system 22 is a conventional system having an amplifier stage 24 that is connected to an audio output jack 31 on guitar 21 via cable 32. Amplifier stage 24 drives a speaker 25.

Electric guitar 21 includes a body 34, a neck 35 and six strings 36 that extend from a head 37 to a tailpiece 30. Strings 36 are suspended between a bridge 38 and a nut 33. An electric pickup 27 is mounted adjacent bridge 38. Neck 35 includes a fingerboard 26 with twenty-two frets 29.

Easily accessible manual controls are mounted on the upper surface of body 34 for manual operation of a three-position switch 40, a freeze toggle 42, a volume control 44, a tone control 47 and a speed control 45. A control circuit 28 and a battery 43 are mounted inside body 34.

Output jack 31 and an input jack 46 are located on a side surface of body 34. Jacks 31, 46 are eclectically connected to circuit 28 as are battery 43 and switch 40.

The present invention conceives that a two-channel storage medium, such as a conventional CD, is prerecorded with audio signals on one channel, e.g. the left channel, and corresponding control signals on the other channel, i.e. the right channel. The control signals are used for operation of a visual display 54 in a manner to be described below in detail while the audio signal is fed to a speaker. As such, an input cable 45 has one end coupled to input jack 46 and its other end connected to the right channel output of a stereo compact disc (CD) player 48 of system 23. The left channel of CD player 48 is connected to an input of a sound device 49 such as a conventional portable radio, cassette player, or the like.

The visual display 54 comprises an array of display lights that are mounted on body 34, fingerboard 26 and head 37. For clarity, the fingerboard lights are not shown in FIGS. 1 and 2. FIGS. 3–6, however, do show the lights of display 54 in detail.

Figure 3:
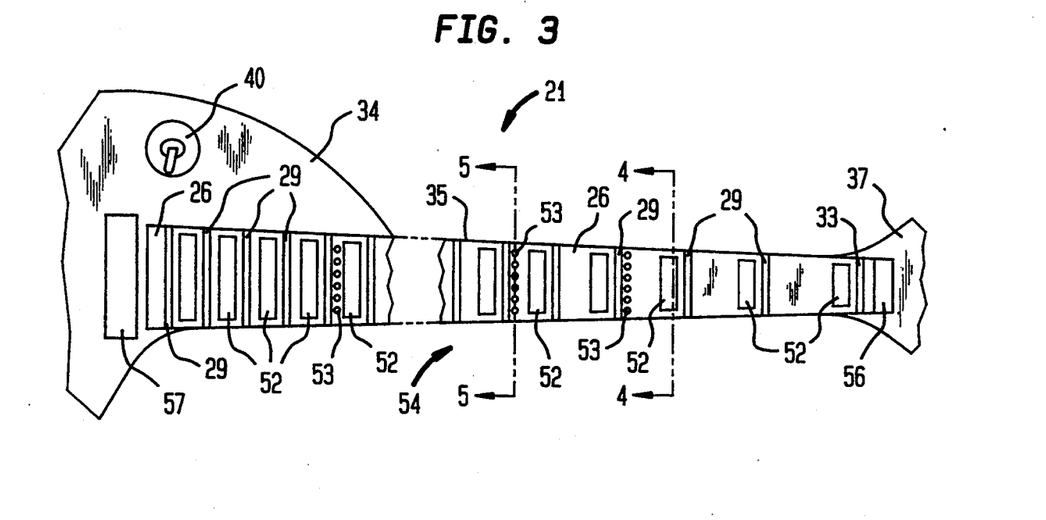
FIG. 3 is an enlarged plan view, with some parts broken away and others shown in greater detail, of a portion of the guitar shown in FIG. 2.
Figure 4:
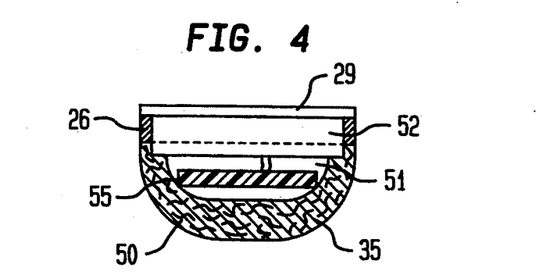
FIG. 4 is a cross section of the guitar neck taken along the line 4—4 of FIG. 3 and looking in the direction of the arrows.
Figure 5:
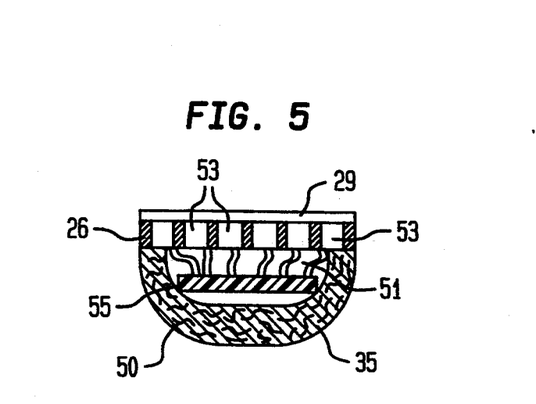
FIG. 5 is a cross section of the guitar neck taken along the line 5—5 of FIG. 3 and looking in the direction of the arrows.

As seen in FIGS. 3–5, neck 35 includes a U-shaped block 50 on which fingerboard 26 is mounted to form a hollow channel 51. A plurality of liquid crystal displays (LCD) 52 are embedded in fingerboard 26 with one LCD 52 located between each of the adjacent frets 29. Also embedded in fingerboard 26 are a plurality of light emitting diode (LED) units 53 at selective locations along fingerboard 26. Each LED unit 53 has two LEDs for a purpose that will be described below. LCDs 52 and LED units 53 are electrically connected to conductors on a printed circuit board 55 that is located in channel 51. Board 55 extends the length of channel 51 and carries a main bus 58 that passes into body 34 where it is connected to circuit 28 (see FIG. 2).

Display 54 also includes a notepad LCD 56 that is recessed in the surface of head 37 adjacent nut 33 and a right-hand, special-instruction display 57 that is mounted on the surface of body 34 adjacent the end of fingerboard 26. Display 57 includes an LCD 59 for displaying alphanumeric playing instructions, and a row of six LEDs 60 aligned with strings 36 for indicating the corresponding string. LCDs 56, 59 and LEDs 60 are electrically connected to main bus 58 on circuit board 55.

Figure 6:
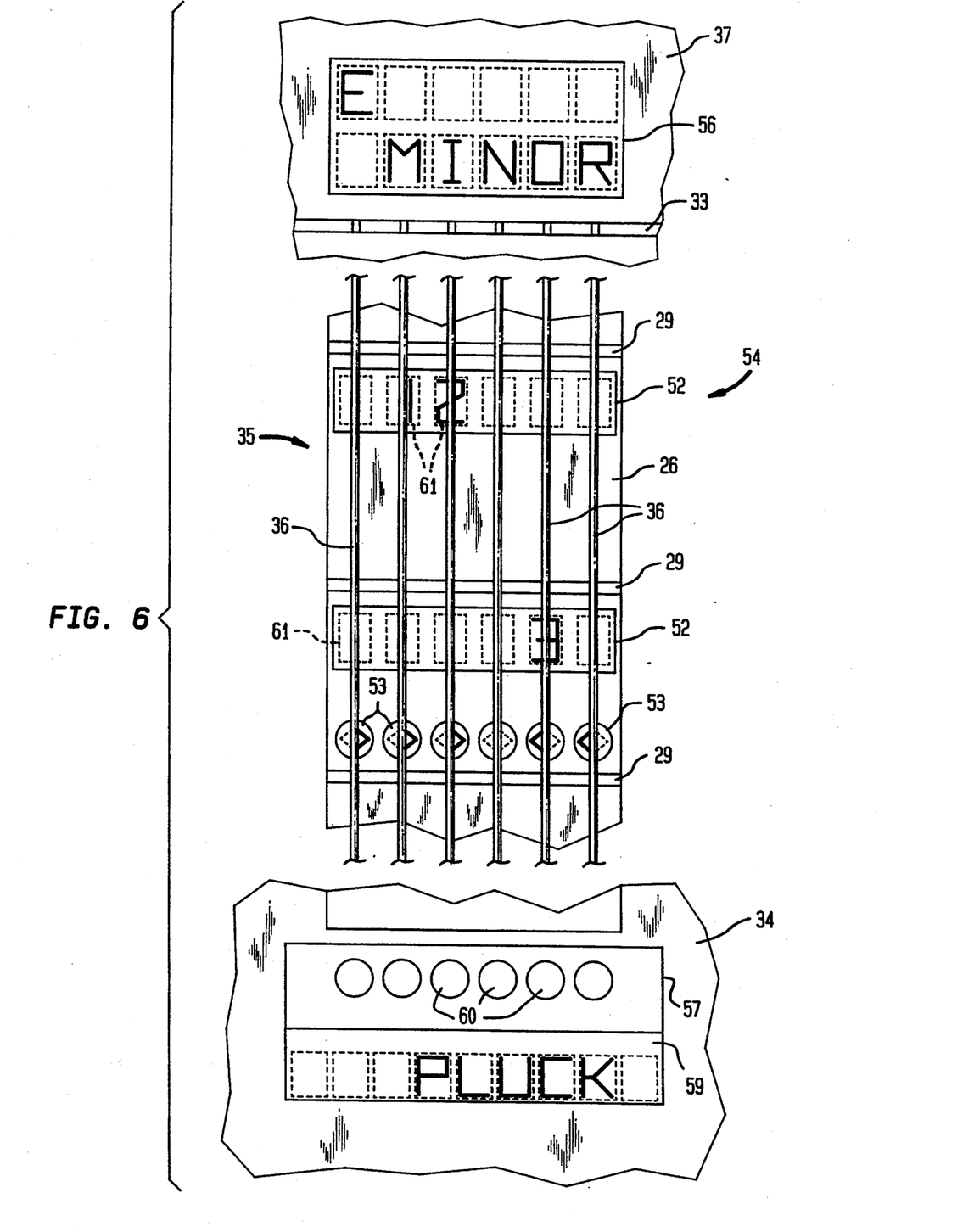
FIG. 6 is an enlarged plan view showing details of the guitar shown in FIGS. 2 and 3.

As can be seen in FIG. 6, the elements of visual display 54 are arranged on guitar 21 to provide a variety of visual fingering and playing information in a convenient viewing area. Each LCD 52 has six display areas 61 (outlined in dashed lines in FIG. 6) that are aligned with a different one of strings 36. Under the control of circuit 28, each display area 61 displays numeric data to indicate fingering information including finger number as well as finger position. For the FIG. 6 example, LCDs 52 indicate that the first and second fingers are to be placed on strings four and five at a common fret 29 and that the third finger is to be placed on string two at the next fret 29.

It is also conceived that LCDs 52 can be used to indicate a fingering situation where a single finger is to be placed on more than one string by displaying a common finger number in more than one display area 61.

For example, when playing bar chords, a single finger, usually the first finger, is placed across all six strings at a single fret 29. In this fingering situation, all six display areas 61 located at the common fret 29 would display the same number, e.g. the number "1."

Rows of six LED units 53 are placed at selected locations on fingerboard 26 to display playing information. LED units 53 are aligned with a different one of strings 36 to indicate which string 36 is to be played, typically with the right hand. As can be seen in FIG. 6, each LED unit 53 has two LEDs that display one of two oppositely directed arrowheads to indicate the string to be played and its direction of play. More specifically, the FIG. 6 example indicates that strings one and two are to be played in one direction and that strings four, five and six are to be played in the opposite direction. Of course, all rows of LED units 53 will normally display the same information.

One preferred placement of LED units 53 is to place one row adjacent each of frets three, five, seven and nine. With this placement of four rows of LED units 53 on a twenty-two fret fingerboard, it is conceived that in most playing situations at least one row of LED units 53 will be located relatively close to the set of illuminated LCD displays 52. As such, left- and right-hand information will normally be available for viewing in a relatively small area, permitting the user to quickly find fingering and playing information with little eye movement.

Notepad LCD 56 has twelve alphanumeric display areas (outlined in dashed lines in FIG. 6) that provide informational notes such as music theory. In the FIG. 6 example, the term "E MINOR" is displayed by notepad LCD display 56. In this regard, FIG. 6 shows the special instruction "PLUCK" on display 57 to indicate that the right-hand should pluck the indicated strings 36.

Figure 7:
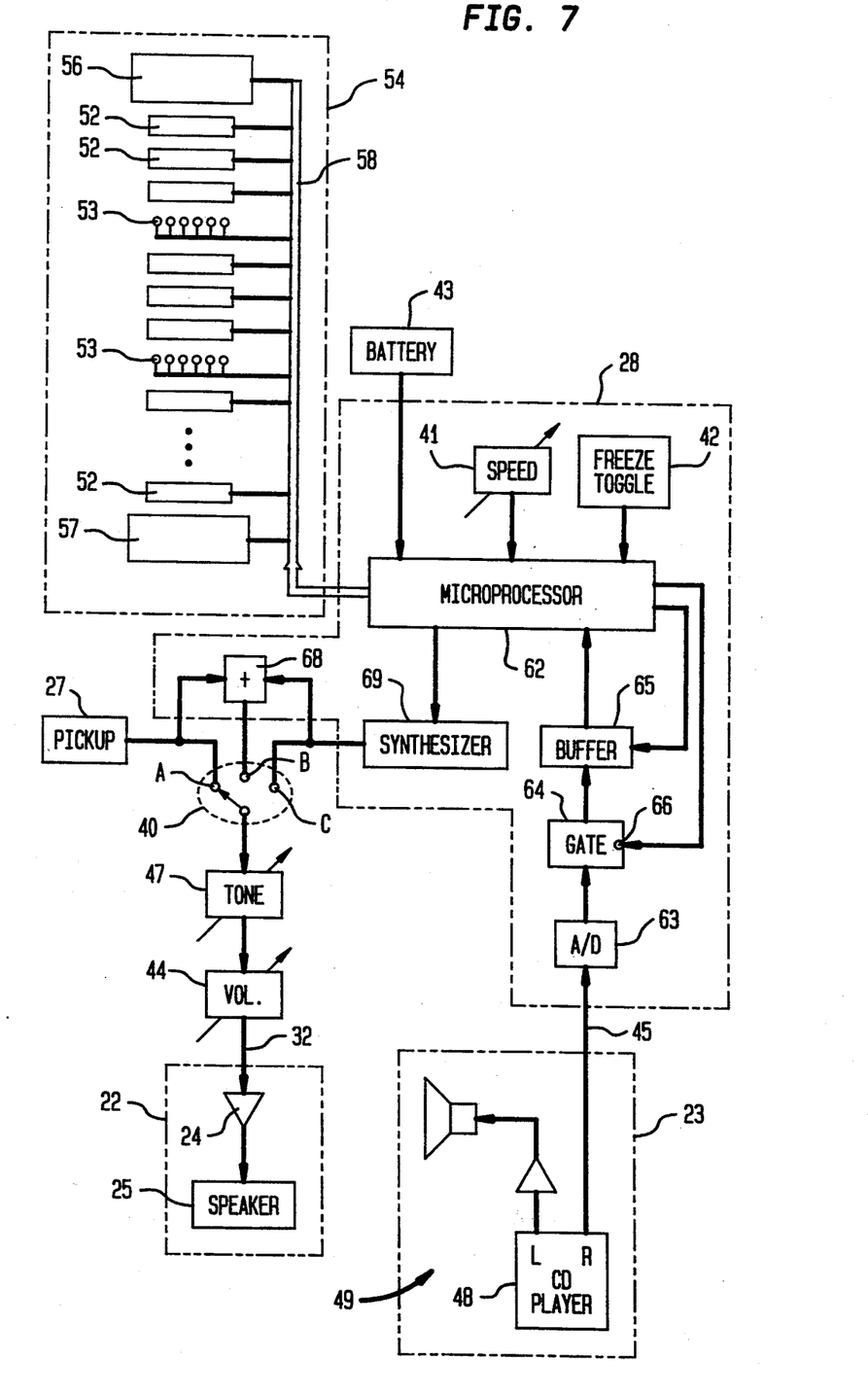
FIG. 7 is a schematic of a functional block diagram for a preferred embodiment of an instructional guitar system made in accordance with the present invention.

As shown in FIG. 7, the lights of visual display 54 are energized by digital control signals that are outputted by a microprocessor 62 via main bus 58. Generation of these digital control signals starts with the right output from CD player 48 being transmitted to circuit 28 via cable 45 which is connected to the input of an analog-to-digital (A/D) converter 63. The digital output of A/D converter 63 is transmitted to a storage buffer 65 via an enable gate 64.

Microprocessor 62 reads the data contents of buffer 65, processes the data and outputs digital control signals to displays 52, 56, display 57 and LED units 53 via main bus 58. In this mode, microprocessor 62 provides the digital control signals in real time as the audio signal from the left channel of CD player 48 is being played by sound device 49. It is also noted that in this real-time mode, the output of guitar pickup 27 is transmitted to sound system 22 via a first contact "A" of three-position switch 40, tone control 47, volume control 44 and cable 32. As such, the users may play guitar 21 while viewing the display of fingering information, right-hand information and other data, and while comparing the results of his playing with a sound reproduction of how the music should sound.

Musical training system 20 may also be operated in a freeze mode. In this mode, the user can perform concentrated practice of short musical segments selected by the user. Such short segments are contemplated to be in the order of seven seconds long in real time.

While playing guitar 21 in the real-time mode, the user initiates the freeze mode by operating freeze toggle 42. It is noted that freeze toggle 42 is preferably a conventional two-state device that, when manually operated, switches from its present state to its other state. It is preferred that a manual push-button type switch be used for toggle 42 so that a musician, while playing guitar 21, can quickly operate the switch.

When toggle 42 is operated, microprocessor 62 detects its state change and responds by disabling gate 64 via its enable/disable terminal 66. With gate 64 disabled, transmission of input data to buffer 65 ceases, thereby "freezing" its current contents. Also in the freeze mode, microprocessor 62 reads the contents of buffer 65 at a rate determined by the setting of speed control 41.

After entering the freeze mode, the user manually adjusts the operation of system 23 to turn off its sound. Next, one of three playback options is chosen by setting switch 40 to one of its three positions (A, B, C).

With switch 40 in position "A," the output of pickup 27 is transmitted to sound system 22. With switch 40 in position "C," pickup 27 is disconnected and the output of a frequency synthesizer 69 is connected to the input of tone control 47. Position "B" of switch 40 transmits the output of an adder 68 to sound system 22. Adder 68 combines the outputs of pickup 27 and frequency synthesizer 69 so that both outputs may be heard simultaneously over system 22. The input to frequency synthesizer 69 comes from microprocessor 62 and is derived from the contents of buffer 65. As such, with system 20 in the freeze mode, the user, via switch 40, has the option of listening only to the results of his guitar playing (position "A"), listening only to a synthesized version of the "frozen" segment over the guitar's sound system 22 (position "C") or listening to both (position "B"). For all three playback options in the freeze mode, the user can adjust the playback speed via speed control 41. Consequently, the user can practice a difficult segment by reducing the playback speed and slowly stepping through the fingering position as he listens to a slowed down, synthesized version of the segment.

Finally, the freeze mode is exited by manually operating toggle 42. When such action is taken, microprocessor 62 detects the state change of toggle 42 and responds by enabling gate 64 via terminal 66. Three-position switch 40 is returned to the "A" position. At this point, system 20 is in the real-time mode as earlier described.

Obviously many modifications and variations of the present invention are possible in the light of the above teachings. While electric guitar 21 is configured to look like a conventional Les Paul-type guitar, those skilled in these arts will readily appreciate that the invention may be used with other guitar configurations. Also in this regard, those skilled in these arts can readily modify an amplified acoustic guitar to incorporate the features of the present invention. Further, many variations in the types and locations of the manual controls and switches are possible. For example, it is contemplated that in some applications the controls and switches may be moved off the guitar. In this regard, freeze toggle 43 and speed control 41 may be easily located in a conventional foot-pedal device.

Figure 8:
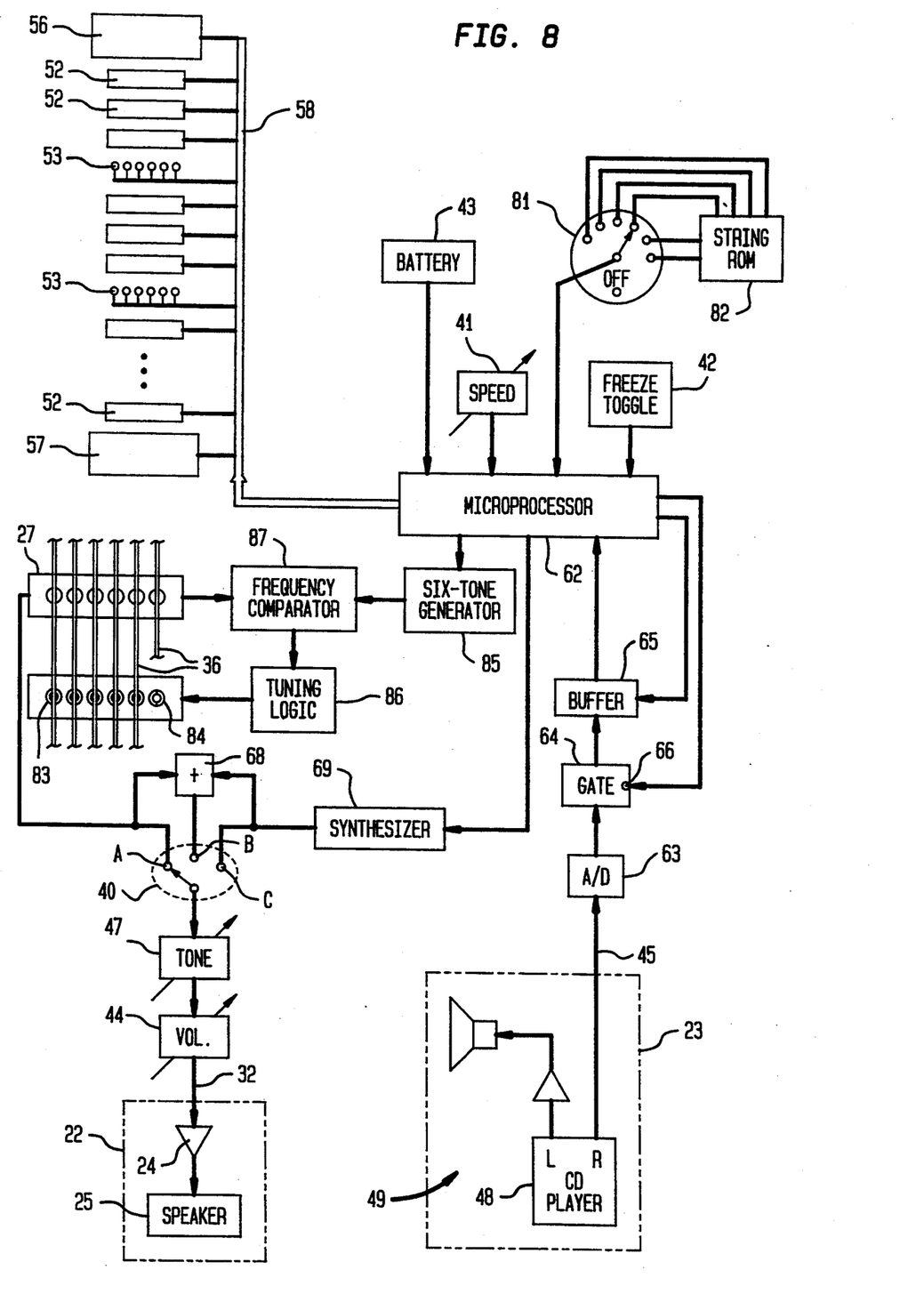
FIG. 8 is a schematic diagram similar to FIG. 7 for a modified embodiment of an instructional guitar system with a tuning capability.

A further modification of the above-described structure is illustrated in FIG. 8. This modification adds a tuning capability. The system of FIG. 8 shows a tunning network comprising a seven-position, string-select switch 81 having a manually movable arm connected to an input of microprocessor 62. Switch 81 includes an OFF contact and six string-select contacts that are connected to six outputs of string ROM 82.

In order to retain the Les Paul configuration shown in FIG. 2, switch 81 is preferably incorporated as part of push toggle 42. While the manual knob for toggle 42 is pushed to enter and exit the freeze mode, it is turned to enter and exit the tunning mode and to select the string to be tuned.

A tunning indicator 83, having a row of six LED units 84, is mounted on the guitar under the strings 36. Indicator 83 is preferably located in the region between bridge 38 and tailpiece 30 or between pickup 27 and display 57. Each LED unit 84 includes three LEDs for indicating whether the pitch is too high, too low or in tune. In this regard, each LED unit 84 has a circular display made up of left and right semicircular regions that form a ring around a circular center region. The left, right and center regions are each illuminated by a different LED.

A tunning output of microprocessor 62 is connected to the input of a six-tone generator 85 and a tunning logic 86. A frequency comparator 87 has one input connected to six-tone generator 85 and a second input connected to guitar pickup 27. The output of frequency comparator 87 is connected to tunning logic 86.

Tunning operation begins with the guitarist moving the arm of switch 81 from the OFF contact to one of the six string-select contacts. In the FIG. 8 example, switch 81 is shown in position to select the third string for tunning. ROM 82 transmits a string-select code to microprocessor 62 which responds by inputting an appropriate code to six-tone generator 85 and tunning logic 86 to indicate that a particular string, say the third string, was selected for tunning. Six-tone generator 85 inputs a signal to comparator 87 that corresponds to the correct pitch for the selected string 36. When the user plucks the selected string 36, its tone is sensed by pickup 27 and transmitted to comparator 87. The frequencies of the two input signals are compared in comparator 87 and an output signal, which is related to the frequency difference of the inputs, is inputted to tunning logic 86 which in turn energizes the appropriate LED of units 84.

For example, if the third string was selected for tunning via switch 81 and its tone was too low when compared in frequency comparator 87, tunning logic 86 would illuminate the left LED of the LED unit 84 that lies below the third string 36. If after adjusting the third string by the guitarist it happens that the tone is too high, logic 86 illuminates only the right LED under the third string 36. When a selected string 36 is in tune and is plucked, the center LED is illuminated via logic 86.

Various other modifications are contemplated and may obviously be resorted to by those skilled in the art without departing from the spirit and scope of the invention, as hereinafter defined by the appended claims, as only preferred embodiments thereof have been disclosed.

What is claimed is:

1. A musical instrument training system comprising:
  a musical instrument having a plurality of strings, a fingerboard having an array of finger positions, and a body;
  a fingering display having means located on said fingerboard substantially at each of said finger positions for selectively identifying which of a users fingers are to be placed at said finger positions; and
  a control circuit means connected to said fingering display for receiving input signals and for controlling said fingering display in response to said input signals.

2. The instrument of claim 1 further including a playing display mounted on said instrument.

3. The system of claim 1 wherein said fingering display includes spaced rows of finger indicators, and wherein said indicators in each said row of finger indicators are embedded in said fingerboard adjacent a different one of said strings.

4. The system of claim 2 wherein said playing display includes means for displaying which of said strings are to be played.

5. The system of claim 4 wherein said playing display further includes a special-instruction display means for displaying characters that indicate playing instructions.

6. The system of claim 5 wherein said special-instruction display means includes a liquid crystal display and said characters include alphanumeric characters.

7. The system of claim 6 wherein said special-instruction display means is mounted on said body adjacent said fingerboard.

8. The system of claim 2 wherein said playing display includes at least one row of lights embedded in said fingerboard, each said light located adjacent a different one of said strings.

9. The system of claim 8 wherein each said light includes means for indicating the direction in which said strings are to be played.

10. The system of claim 9 wherein said playing display includes a plurality of said rows of lights, said rows located at spaced points on said fingerboard.

11. The system of claim 10 wherein said lights include light emitting diodes.

12. The system of claim 2 further including a message display means for displaying non-playing and non-fingering message.

13. The system of claim 12 wherein said message display means includes a liquid crystal display having means for displaying alphanumeric characters.

14. The system of claim 2 wherein said control circuit means includes a microprocessor circuit means for converting said input signals into control signals for controlling said fingering and playing displays.

15. A musical instrument training system comprising:
  a musical instrument having a plurality of strings, a fingerboard and a body;
  a fingering display mounted on said fingerboard, said fingering display including spaced rows of finger indicators with the finger indicators in each said row of finger indicators being located on said fingerboard adjacent a different one of said strings, and each of said finger indicators including indicia means for indicating which finger is to be placed on said string adjacent the corresponding finger indicator; and
  a control circuit means mounted on said body for receiving input signals and for controlling said fingering display in response to said input signals.

16. The system of claim 15 wherein said indicia means includes means for displaying numeric characters corresponding to said fingers.

17. The system of claim 16 wherein said finger indicators include liquid crystal displays.

18. A musical instrument training system comprising:
  a musical instrument having a plurality of strings, a fingerboard and a body;
  a fingering display mounted on said fingerboard;
  a playing display mounted on said body;

a control circuit means mounted on said body for receiving input signals and for controlling said fingering and playing displays in response to said input signals, said control circuit means including a microprocessor circuit means for converting said input signals into control signals for controlling said fingering and playing displays, said control circuit means including a storage means for storing a predetermined section of said input signals and for causing said microprocessor circuit means to convert said predetermined section into said control signals, said storage means including manually operable means for operating said storage means and manually operable speed means for varying the speed that said microprocessor circuit means controls said display means; and an electric pickup means mounted on said instrument for converting audio signals produced by said strings into a first audio output signal.

19. The system of claim 18 wherein said control circuit further includes a frequency synthesizer means for converting signals produced by said microprocessor circuit means into a second audio output signal in response to operation of said storage means.

20. The system of claim 19 further including an instrument output and a manually operable switch means for selectively connecting said first audio signal or said second audio signal or both to said instrument output.

21. The system of claim 20 further including a tone control and a volume control connected to said switch means.

22. The system of claim 21 further including:
a multi-channel signal storage medium having audio signals stored in a first channel and corresponding display-control signals stored in a second channel;
a first sound system connected to said first channel; and
means connecting said second channel to said control circuit.

23. The system of claim 22 further including a second sound system connected to said instrument output.

24. A musical instrument training system comprising:
a musical instrument having a plurality of strings, a fingerboard and a body;
a fingering display mounted on said fingerboard; and
a control circuit means mounted on said body for receiving input signals and for controlling said fingering display in response to said input signals, said control circuit means including a microprocessor circuit means for converting said input signals into control signals for controlling said fingering display, and including a tuner having a tuning display means for indicating whether a selected one of said strings is in tune.

25. The system of claim 24 wherein said tuner includes:
a manually operable string-select control means connected to said microprocessor circuit means for selecting one of said strings to tune;
a multi-frequency generator means connected to said microprocessor circuit means for generating an output frequency related to the selected one of said strings; and
a frequency comparator means for comparing said output frequency with the natural frequency of said selected one of said strings and for controlling said tuning display means.

26. The system of claim 25 further including an electric pickup means for converting audio signals produced by said strings into an electric signal.

27. A musical instrument tuning system comprising:
a musical instrument having a plurality of strings, a fingerboard, a body, and an electric pickup;
a microprocessor mounted on said body; a tuning display means mounted on said instrument for indicating whether a selected one of said strings is in tune;
a manually operable string-select control connected to said microprocessor for selecting one of said strings to tune;
a multi-tone generator means connected to said microprocessor for generating an output tone related to the selected one of said strings; and
a frequency comparator means connected to said multi-tone generator and said electric pickup for comparing said output tone with the natural frequency of said selected one of said strings and for controlling said tuning display means.

28. The system of claim 27 wherein said tuning display means includes means for indicating whether the selected one of said strings is too high, too low or in tune.

29. The system of claim 28 wherein said tuning display includes a row of light units mounted on said instrument with each said unit located adjacent a different one of said strings.

30. The system of claim 29 wherein each said unit includes first, second and third lights to indicate whether the selected one of said strings is too high, too low or in tune, respectively.

31. The system of claim 30 wherein said lights are light emitting diodes.

32. A musical instrument training system comprising:
a musical instrument having a plurality of strings, a fingerboard and a body;
a fingering display mounted on said fingerboard; and
a control circuit means connected to said fingering display for receiving input signals and for controlling said fingering display in response to said input signals, and including a sequence storage means for selectively storing a predetermined section of said input signals and for controlling said fingering display in a series of repetitive cycles with said predetermined section of said input signals being repeated during each of said cycles.

33. The system of claim 32 wherein said sequence storage means includes manually operable means for operating said sequence storage means.

34. The system of claim 33 wherein said sequence storage means includes manually operable speed means for varying the speed that said control circuit controls said display means.

35. A musical instrument training system comprising:
a musical instrument having a plurality of strings, a fingerboard with an array of finger positions and a body;
a fingering display mounted on said fingerboard, said fingering display having indicator means located at said finger positions for selectively identifying which of a users fingers are to be placed at said finger positions; and
a control circuit means connected to said fingering display for controlling said fingering display.

36. The system of claim 35 wherein said indicator means includes spaced rows of finger indicators, and wherein said indicators in each said row include indicia means for indicating which finger is to be placed on said string adjacent the corresponding finger indicator.

37. A musical instrument training system comprising:
  a musical instrument having a plurality of strings, a fingerboard and a body;
  a fingering display mounted on said fingerboard;
  a signal input means for generating control input signals;
  a control circuit means connected to said signal input means and said fingering display for controlling said fingering display in response to said control input signals; and
  a storage means connected to said control circuit means and said signal input means for selectively storing a predetermined section of said control input signals and for causing said control circuit means to control said fingering display in a series of repetitive cycles with said predetermined section of said input signals being repeated during each of said cycles.

38. The system of claim 37 wherein said storage means includes speed control means for adjusting the rate that said control circuit means controls said fingering display.

* * * * *